(12) United States Patent
Lim et al.

(10) Patent No.: US 9,185,727 B2
(45) Date of Patent: Nov. 10, 2015

(54) ACCESS POINT FOR WIRELESS LAN AND MEDIUM ACCESS CONTROL METHOD THEREOF

(71) Applicant: GWANGJU INSTITUTE OF SCIENCE AND TECHNOLOGY, Gwangju (KR)

(72) Inventors: Hyuk Lim, Gwangju (KR); Jae Hyung Jang, Gwangju (KR); Wooyeol Choi, Gwangju (KR); Jaeseon Hwang, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 102 days.

(21) Appl. No.: 14/030,256

(22) Filed: Sep. 18, 2013

(65) Prior Publication Data

US 2015/0078214 A1    Mar. 19, 2015

(51) Int. Cl.
*H04W 28/08*    (2009.01)
*H04W 74/00*    (2009.01)
*H04B 1/50*    (2006.01)
*H04W 88/08*    (2009.01)

(52) U.S. Cl.
CPC .............. *H04W 74/002* (2013.01); *H04B 1/50* (2013.01); *H04W 88/08* (2013.01)

(58) Field of Classification Search
CPC ........ H04W 52/40; H04B 7/0617; H04B 7/04
USPC .......................................... 370/252, 328, 335
See application file for complete search history.

(56) References Cited

U.S. PATENT DOCUMENTS

| | | | | |
|---|---|---|---|---|
| 7,609,648 | B2 * | 10/2009 | Hoffmann et al. | 370/252 |
| 7,817,614 | B2 * | 10/2010 | Yang et al. | 370/346 |
| 8,068,871 | B2 * | 11/2011 | Xhafa et al. | 455/552.1 |
| 8,175,003 | B2 * | 5/2012 | Panwar et al. | 370/253 |
| 8,400,959 | B2 * | 3/2013 | Doi et al. | 370/324 |
| 8,675,633 | B2 * | 3/2014 | Nabetani et al. | 370/350 |
| 2005/0030930 | A1 * | 2/2005 | Cho et al. | 370/338 |
| 2006/0098592 | A1 * | 5/2006 | Proctor, Jr. et al. | 370/315 |
| 2006/0114826 | A1 * | 6/2006 | Brommer | 370/230 |
| 2006/0221924 | A1 * | 10/2006 | Yang et al. | 370/338 |
| 2009/0103501 | A1 * | 4/2009 | Farrag et al. | 370/337 |
| 2013/0114468 | A1 * | 5/2013 | Hui et al. | 370/277 |

\* cited by examiner

*Primary Examiner* — Chandrahas Patel
*Assistant Examiner* — Lan Huong Truong
(74) *Attorney, Agent, or Firm* — Hauptman Ham, LLP

(57) ABSTRACT

In a medium access control method of an access point for a wireless LAN, the access point is capable of full-duplex communication, and the medium access control method includes receiving a frame header of a first data frame from a first terminal, and transmitting a second data frame to a second terminal while the first data frame is received from the first terminal.

9 Claims, 3 Drawing Sheets

ACCESS POINT FOR WIRELESS LAN AND MEDIUM ACCESS CONTROL METHOD THEREOF

BACKGROUND

1. Technical Field

The present invention relates to an access point for a wireless LAN and a medium access control method thereof. More particularly, the present invention relates to an access point capable of full-duplex communication, and a medium access control method thereof.

2. Description of the Related Art

In the current wireless local area network (WLAN) environment, although a wireless terminal and an access point (AP) may communicate bi-directionally, they transmit and receive data using a half-duplex communication method through which data can be transmitted or received only in one direction at a time. That is, the access point may transmit data to the wireless terminal or another wireless terminal may transmit data to the access point only after data transmission from the wireless terminal to the access point is completed.

In this way, in an existing wireless LAN system using a single antenna, transmission and reception cannot be performed simultaneously, and it is only possible to divide time into very short time units and perform transmission or reception at an allotted time. This is the reason why, while a signal is transmitted using a single antenna, a signal cannot be received through the same antenna. Since a signal transmitted through a wireless medium cannot be received while transmitting due to such a constraint, there is a limit in to wireless LAN performance.

However, as signal processing techniques and antenna techniques have recently advanced, a self-interference cancellation technique which allows simultaneous transmission and reception of data through two or more antennas has recently been developed. A full-duplex communication scheme using a plurality of antennas is a new technique using only one channel, unlike existing methods using a plurality of channels, and, although it is expected to improve performance if the full-duplex communication scheme using a plurality of antennas is adopted in a wireless LAN environment since it can simultaneously transmit and receive data, it is difficult to combine an existing medium access control (MAC) method with conventional full-duplex communication schemes.

BRIEF SUMMARY

It is an aspect of the present invention to provide a medium access control method that can efficiently use limited channel resources based on a full-duplex communication scheme using a plurality of antennas in a wireless LAN environment.

As described above, full-duplex communication can be accomplished through a single channel with a plurality of antennas using a self-interference cancellation technique. The most outstanding feature of the full-duplex communication is that transmission and reception can be simultaneously performed. Theoretically, since a full-duplex communication scheme may simultaneously perform both transmission and reception, the overall performance of a wireless network employing full-duplex communication appears to be double that of a wireless network employing half-duplex communication. However, this is allowed only in ideal cases. For example, when there are two nodes and both nodes transmit data to a counterpart while receiving data transmitted from the counterpart, theoretical performance is double that of half-duplex communication.

However, such an ideal case is uncommon in a real wireless network environment, and considerably irregular and diverse situations occur. Further, costs are high and such an ideal case is impossible in a real wireless network environment to replace all wireless terminals widely used in a wireless LAN environment with terminals capable of full-duplex communication using a plurality of antennas. Thus, the present invention proposes a medium access control method for efficiently using limited channel resources considering diverse situations, in which only access points providing a wireless LAN service are allowed to implement a full-duplex communication scheme using a plurality of antennas while existing wireless terminals are used.

In accordance with one aspect of the present invention, there is provided a medium access control method of an access point for a wireless LAN, which is capable of full-duplex communication and includes: receiving a frame header of a first data frame from a first terminal; and transmitting a second data frame to a second terminal while the first data frame is received from the first terminal.

The access point may have at least two antennas including an antenna for transmission and an antenna for reception.

The transmitting a second data frame may be completed before reception of the first data frame is completed.

The method may further include extracting a network allocation vector (NAV) from the received frame header; and determining a length of the second data frame based on the extracted NAV before transmitting the second data frame.

The length of the second data frame may be determined to complete transmission of the second data frame before reception of the first data frame is completed.

The method may further include transmitting an acknowledgement (ACK) frame to the first terminal if reception of the first data frame is completed.

The method may further include waiting for reception of an ACK frame from the second terminal if the transmission of the second data frame is completed.

In accordance with another aspect of the present invention, there is provided an access point for a wireless LAN. The access point has at least two antennas including a transmit antenna for transmission and a receive antenna for reception and is capable of full-duplex communication. If a frame header of a first data frame is received from a first terminal through the receive antenna, the access point transmits a second data frame to a second terminal through the transmit antenna while receiving the first data frame from the first terminal through the receive antenna.

The access point may complete transmission of the second data frame before reception of the first data frame is completed.

The access point may extract a NAV from the received frame header and determine a length of the second data frame based on the extracted NAV before transmitting the second data frame.

The access point may determine the length of the second data frame to complete transmission of the second data frame before reception of the first data frame is completed.

The access point may transmit an ACK frame to the first terminal if reception of the first data frame is completed.

The access point may wait for reception of an ACK frame from the second terminal if transmission of the second data frame is completed.

According to embodiments of the present invention, only access points providing a wireless LAN service are allowed to implement a full-duplex communication scheme using a plurality of antennas while existing wireless terminals are used, and thus limited channel resources can be efficiently used considering diverse situations.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
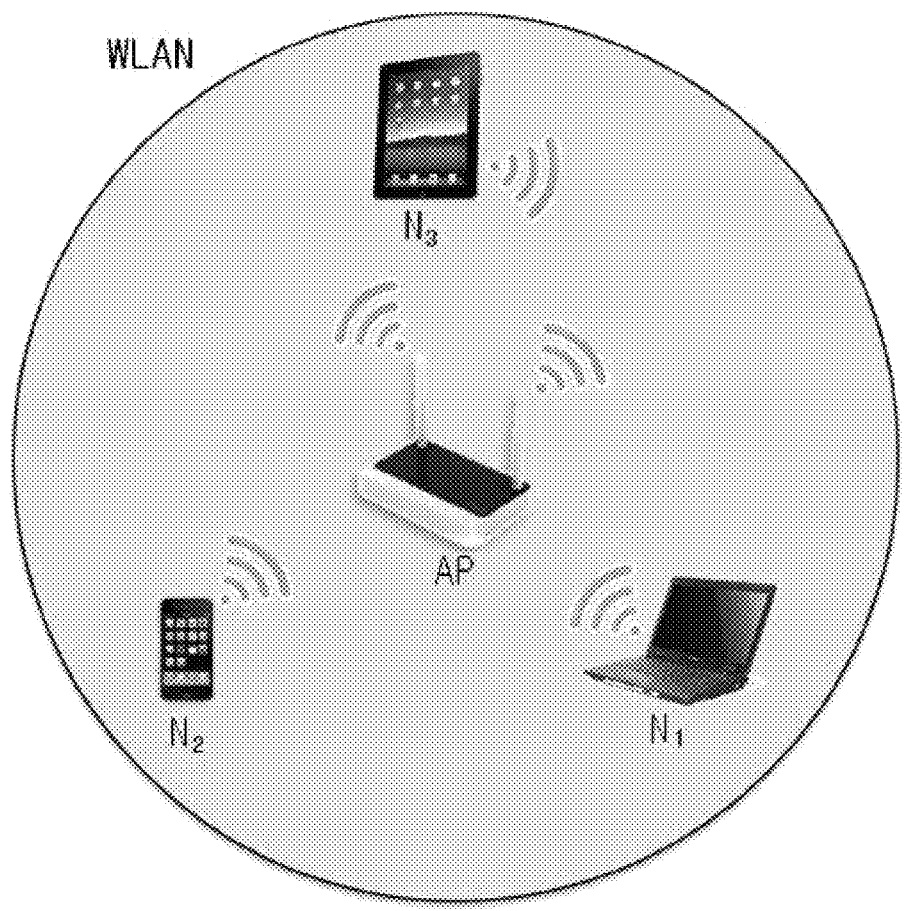
FIG. 1 shows one example of a wireless LAN system in accordance with one embodiment of the present invention.

Exemplary embodiments of the present invention will now be described in detail with reference to the accompanying drawings. Like components will be denoted by like reference numerals throughout the specification and the drawings to omit repeated descriptions. In addition, detailed descriptions of details apparent to those skilled in the art will be omitted for clarity.

FIG. 1 shows one example of a wireless LAN system in accordance with one embodiment of the present invention.

In this embodiment, an AP exchanges data with each of wireless terminals N1, N2 and N3 within the wireless LAN coverage of the AP using a single channel. Apparently, although less than or more than three wireless terminals may exist within the wireless LAN coverage, three wireless terminals are shown for convenience of explanation. Although a notebook computer, a smart phone and a tablet PC are shown as wireless terminals N1, N2 and N3 in the figure as an example, any type of terminals which can use a wireless LAN service through wireless communication may be used.

The AP has at least two antennas including at least one antenna for transmission (hereinafter referred to as a transmit antenna) and at least one antenna for reception (hereinafter referred to as a receive antenna) and is capable of full-duplex communication using a self-interference cancellation technique.

However, each of the wireless terminals N1, N2, N3 has one antenna, and cannot simultaneously perform transmission and reception, and each transmits and receives data through half-duplex communication. However, those skilled in the art may understand that although some or all of wireless terminals within a wireless LAN coverage have two or more antennas like the AP and are capable of full-duplex communication, the medium access control method according to the invention may be applied to wireless terminals.

As described above, the wireless terminals N1, N2 and N3 transmit a desired data to the AP and receive an acknowledgement (ACK) frame from the AP if transmission of the data is successfully completed, as in an existing wireless LAN system (e.g., IEEE 802.11 wireless LAN). If the wireless terminals do not receive the ACK frame from the AP within a predetermined duration of time, they will attempt retransmission.

The AP is capable of full-duplex communication using a self-interference cancellation technique as described above. However, since the wireless terminals do not support full-duplex communication, the wireless terminals may not receive data from a certain wireless terminal while transmitting data to the certain wireless terminal. However, the AP may receive data from a certain wireless terminal while transmitting data to another wireless terminal. The AP has information on the wireless terminals within the wireless LAN coverage, and it is preferable to use a centralized control method so that the entire wireless LAN system may operate smoothly.

Figure 2:
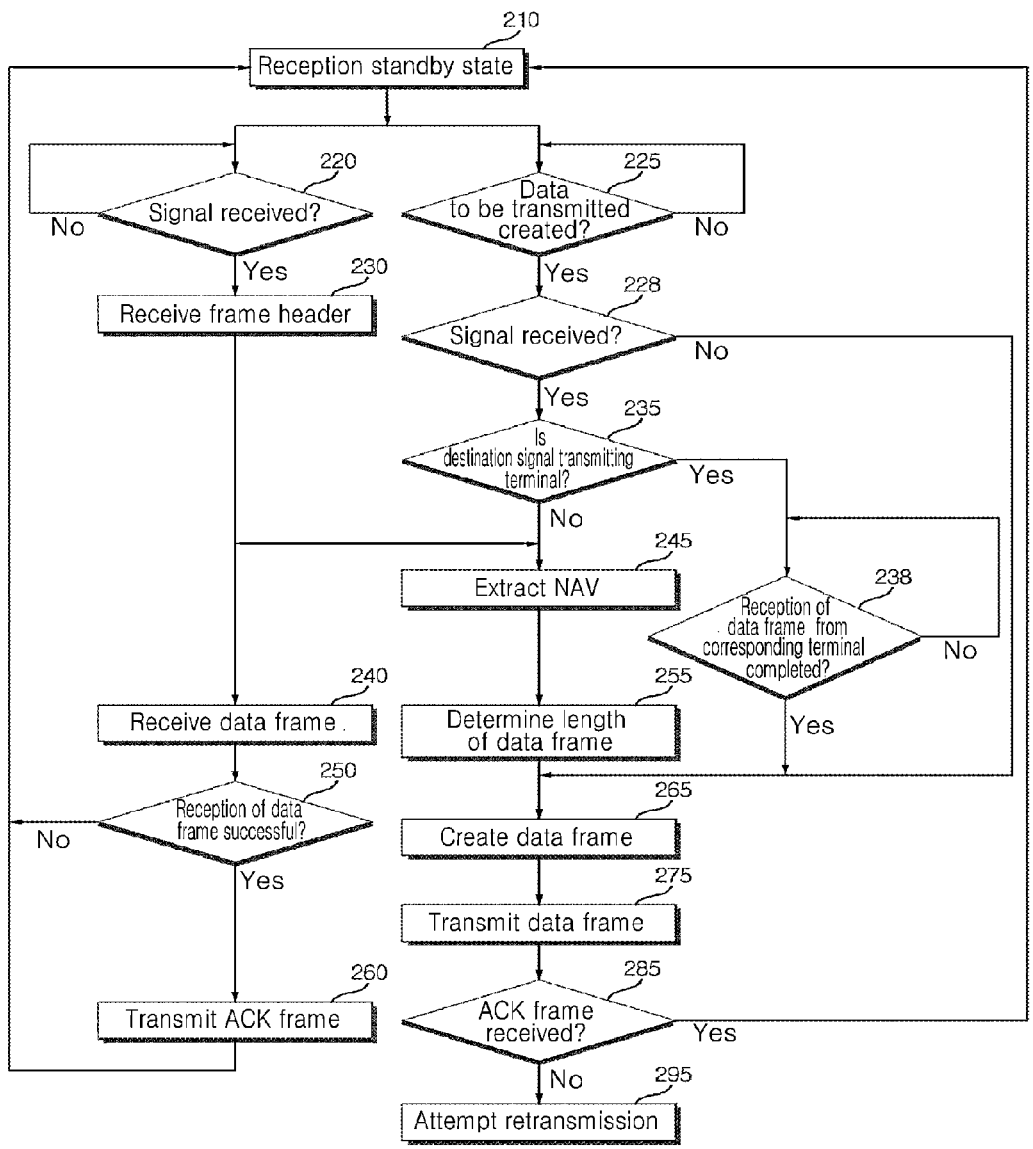
FIG. 2 is a flowchart of a medium access control method of an AP in accordance with one embodiment of the present invention.

FIG. 2 is a flowchart of a medium access control method of an AP in accordance with one embodiment. Hereinafter, the 'wireless terminal' is referred to as a 'terminal' for convenience.

Basically, the AP maintains the receive antenna in a reception standby state (Operation 210). If a signal is received through the receive antenna (Operation 220), the AP first receives a frame header (Operation 230). Here, receiving a frame header includes the process of decoding the frame header received through the receive antenna and confirming content of the frame header, such as a source address and a destination address contained in the frame header. If reception of the frame header is completed, the AP receives a data frame which follows the header frame also through the receive antenna (Operation 240). If reception of the data frame in Operation 240 is succeeded (Operation 250), e.g., decoding of the data frame and the like are successfully accomplished, the AP transmits an ACK frame to a terminal that has transmitted data through the transmit antenna in response to the data (Operation 260). The terminal that has transmitted the data receives the ACK frame and may confirm that transmission of the data is successfully completed. After transmitting the ACK frame, the AP returns to the reception standby state again (Operation 210). If reception of the data frame fails in Operation 250, the AP does not transmit the ACK frame and returns to the reception standby state again (Operation 210). Then, the terminal that has transmitted the data confirms that transmission of the data fails as the ACK frame is not received and attempts retransmission of the data.

When data to be transmitted to a certain terminal is created in an upper layer (Operation 225), the AP confirms whether a signal is currently received through the receive antenna (Operation 228). If a signal is not currently received through the receive antenna, the AP immediately creates a data frame (Operation 265) and transmits the data frame (Operation 275). However, if a signal is currently received through the receive antenna, the AP confirms whether the destination of the data to be transmitted is the terminal which transmits the currently received signal (Operation 235). If the destination of the data to be transmitted is the terminal which transmits the currently received signal, the AP waits until reception of the data frame transmitted from the terminal is completed (Operation 238), creates a data frame to be transmitted after reception of the data frame is completed (Operation 265), and transmits the data frame (Operation 275). However, creating a data frame to be transmitted (Operation 265) may be performed in advance while the data frame is received. The length of the data frame created after Operation 228 or 238 corresponds to a predetermined length or a general data frame length.

In one embodiment, since a terminal does not support full-duplex communication, i.e., since it may not simultaneously perform transmission and reception, the AP transmits data to the terminal when the terminal transmitting a signal completes transmission.

Referring to Operation 235 again, if the destination of the data to be transmitted is not the terminal which transmits the signal currently received through the receive antenna, i.e., if the terminal transmitting the data to the AP is different from the terminal to which the AP desires to transmit data, the AP transmits the data through the transmit antenna while the signal is received through the receive antenna.

The AP extracts a NAV indicating a duration of occupying a channel until transmission of the data frame is completed from the frame header received through the receive antenna in Operation 230 (Operation 245). The AP may know when reception of the currently received data frame will be completed through the NAV. With reference to the NAV, the AP determines a length of the data frame to be transmitted so that transmission of the data frame may be completed before reception of the currently received data frame is completed (Operation 255). For example, the AP calculates, based on the current data transmission rate, a length of a data frame that will be completed to be transmitted at a time point when the channel occupation period expires and determines a length of the data frame to be transmitted to be the same as the calculated data frame length or to be smaller than the calculated data frame length by a predetermined length. Then, the AP creates a data frame according to the data frame length determined as above (Operation 265) and transmits the created data frame to the destination terminal through the transmit antenna (Operation 275). Transmission of the data frame through the transmit antenna is performed while a data frame is received through the receive antenna in Operation 240, and a time required to transmit a data frame does not exceed a time required for reception of a data frame.

A time required for transmitting a data frame through the transmit antenna should not exceed a time required for receiving a data frame through the receive antenna since the AP should immediately transmit an ACK frame to the terminal that has transmitted the data frame through the transmit antenna when reception of the data frame through the receive antenna is completed.

If transmission of the data frame through the transmit antenna is completed in Operation 275, the AP waits for reception of an ACK frame corresponding to the transmitted data frame (Operation 285). If an ACK frame is received within a predetermined time, transmission of the data is successfully completed, and thus the AP returns to the reception standby state (Operation 210). If an ACK frame is not received within a predetermined time, transmission of the data fails, and thus the AP attempts retransmission of the data (Operation 295), e.g., the AP returns to Operation 228.

Figure 3:
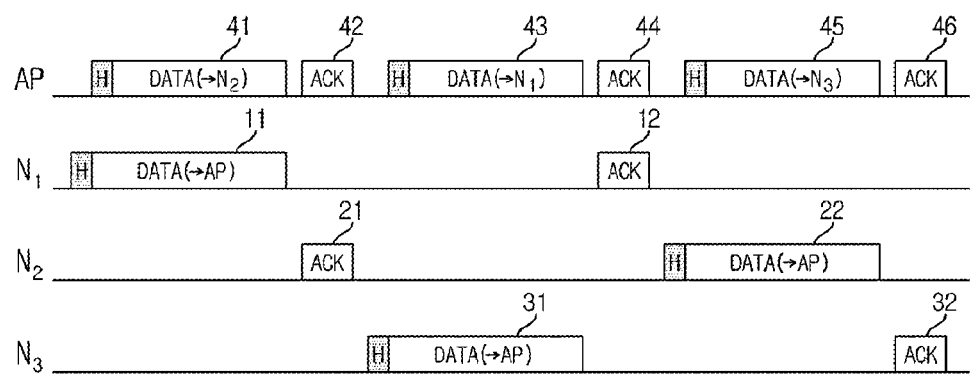
FIG. 3 shows a timing diagram of data transmission in accordance with one embodiment of the present invention in a wireless LAN environment as shown in FIG. 1.

FIG. 3 shows a timing diagram of data transmission in accordance with one embodiment of the present invention in a wireless LAN environment, as shown in FIG. 1. FIG. 3 shows one example of determining a length of a data frame to be transmitted so that data reception and data transmission may be completed at the same time point in transmission of data through a transmit antenna while the AP receives data through a receive antenna. The length of a data frame may be determined so that transmission of data may be completed earlier than reception of data as described above.

Referring to FIG. 3, first, terminal N1 transmits a data frame 11 to the AP. The AP creates a data to be transmitted to terminal N2 while receiving the data frame 11 through a receive antenna. Accordingly, the AP extracts a NAV from the frame header of the data frame 11, determines a data frame length based on the NAV, and creates and transmits a data frame 41 to terminal N2 through a transmit antenna while receiving the data frame 11 through the receive antenna. According to the length of the data frame 41 determined as above, reception of the data frame 11 and transmission of the data frame 41 are completed at the same time. The AP transmits an ACK frame 42 to terminal N1 through the transmit antenna in response to the data frame 11. Meanwhile, terminal N2 transmits an ACK frame 21 to the AP in response to the data frame 41, and the AP receives the ACK frame 21 through the receive antenna.

Next, terminal N3 transmits a data frame 31 to the AP. Here, the AP creates a data to be transmitted to terminal N1 while receiving the data frame 31 through the receive antenna. Accordingly, the AP extracts a NAV from the frame header of the data frame 31, determines a data frame length based on the NAV, and creates and transmits a data frame 43 to terminal N1 through the transmit antenna while receiving the data frame 31 through the receive antenna. According to the length of the data frame 43 determined above, reception of the data frame 31 and transmission of the data frame 43 are completed at the same time. The AP transmits an ACK frame 44 to terminal N3 through the transmit antenna in response to the data frame 31. Meanwhile, terminal N1 transmits an ACK frame 12 to the AP in response to the data frame 43, and the AP receives the ACK frame 12 through the receive antenna.

Next, terminal N2 transmits a data frame 22 to the AP. Here, the AP creates a data to be transmitted to terminal N3 while receiving the data frame 22 through the receive antenna. Accordingly, the AP extracts a NAV from the frame header of the data frame 22, determines a data frame length based on the NAV, and creates and transmits a data frame 45 to terminal N3 through the transmit antenna while receiving the data frame 22 through the receive antenna. According to the length of the data frame 45 determined above, reception of the data frame 22 and transmission of the data frame 45 are completed at the same time. The AP transmits an ACK frame 46 to terminal N2 through the transmit antenna in response to the data frame 22. Meanwhile, terminal N3 transmits an ACK frame 32 to the AP in response to the data frame 45, and the AP receives the ACK frame 32 through the receive antenna.

As described above, since the access point has a transmit antenna and a receive antenna to communicate using a full-duplex communication scheme and simultaneously performs transmission and reception through the medium access control method described above, the AP may exchange more data with terminals in a short time period, and overall performance of a wireless LAN system can be improved by reducing the bottleneck at the access point.

The embodiments of the invention described above may be created as a program that can be executed by a computer and can be implemented in a general-purpose digital computer which operates the program using a computer-readable recording medium. The computer-readable recording medium includes storage media such as magnetic storage media (e.g., ROM, a floppy disk, a hard disk and the like) and optical reading media (e.g., CD-ROM, DVD and the like).

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A medium access control method of an access point for a wireless LAN, the access point being capable of full-duplex communication, method comprising:
   receiving a frame header of a first data frame from a first terminal;
   transmitting a second data frame to a second terminal while the first data frame is received from the first terminal;

extracting a network allocation vector (NAV) from the received frame header; and determining a length of the second data frame based on the extracted NAV before transmitting the second data frame, wherein the length of the second data frame is determined to complete transmission of the second data frame before reception of the first data frame is completed.

2. The medium access control method according to claim 1, wherein the access point has at least two antennas including an antenna for transmission and an antenna for reception.

3. The medium access control method according to claim 1, wherein the transmitting a second data frame is completed before reception of the first data frame is completed.

4. The medium access control method according to claim 1, further comprising: transmitting an acknowledgement (ACK) frame to the first terminal if reception of the first data frame is completed.

5. The medium access control method according to claim 1, further comprising: waiting for reception of an ACK frame from the second terminal if transmission of the second data frame is completed.

6. An access point for a wireless LAN, the access point having at least two antennas including a transmit antenna for transmission and a receive antenna for reception and being capable of full-duplex communication, wherein, if a frame header of a first data frame is received from a first terminal through the receive antenna, the access point transmits a second data frame to a second terminal through the transmit antenna while receiving the first data frame from the first terminal through the receive antenna, wherein a NAV is extracted from the received frame header and determines a length of the second data frame based on the extract NAV before transmission of the second data frame, and wherein the length of the second data frame is determined to complete the transmission of the second data frame before reception of the first data frame is completed.

7. The access point according to claim 5, wherein the transmitting a second data frame is completed before reception of the first data frame is completed.

8. The access point according to claim 5, wherein an ACK frame is transmitted to the first terminal if reception of the first data frame is completed.

9. The access point according to claim 5, wherein reception of an ACK frame from the second terminal is awaited if transmission of the second data frame is completed.

* * * * *